United States Patent
Christian, Jr. et al.

(10) Patent No.: US 11,661,101 B2
(45) Date of Patent: May 30, 2023

(54) SETTING VEHICLE CENTER IN ELECTRONIC POWER STEERING SYSTEM

(71) Applicant: HONDA MOTOR CO., LTD., Tokyo (JP)

(72) Inventors: David Theodore Christian, Jr., Troy, OH (US); Takumi Makabe, Sakado (JP); Rodney M. Frijas, Powell, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 341 days.

(21) Appl. No.: 16/995,441

(22) Filed: Aug. 17, 2020

(65) Prior Publication Data

US 2022/0048558 A1    Feb. 17, 2022

(51) Int. Cl.
```
B62D 5/04      (2006.01)
B60Q 9/00      (2006.01)
B62D 15/02     (2006.01)
B62D 3/12      (2006.01)
```

(52) U.S. Cl.
CPC ............ B62D 5/046 (2013.01); B60Q 9/00 (2013.01); B62D 3/126 (2013.01); B62D 15/0225 (2013.01)

(58) Field of Classification Search
CPC .......... B60Q 9/00; B62D 5/046; B62D 3/126; B62D 15/0225; B62D 15/0245; B62D 5/0457; B62D 5/0466
See application file for complete search history.

(56) References Cited

U.S. PATENT DOCUMENTS

| | | |
|---|---|---|
| 6,895,357 B2 | 5/2005 | Lou et al. |
| 6,966,399 B2 | 11/2005 | Tanigaki et al. |
| 7,350,617 B2 | 4/2008 | Lausser et al. |
| 7,481,294 B2 | 1/2009 | Fujita et al. |
| 8,122,993 B2 | 2/2012 | Ripley et al. |
| 8,364,348 B2 | 1/2013 | Zell et al. |
| 8,584,516 B2 | 11/2013 | Ellis et al. |
| 9,073,569 B2 | 7/2015 | Di Cairano |
| 9,079,607 B2 | 7/2015 | Tanimoto et al. |
| 9,758,191 B2 | 9/2017 | Kim |
| 9,937,951 B2 | 4/2018 | Pregniard et al. |

(Continued)

FOREIGN PATENT DOCUMENTS

| | | |
|---|---|---|
| KR | 10-2018-0007061 A | 1/2018 |
| KR | 10-1896313 B1 | 9/2018 |
| WO | WO 2014/108955 A1 | 7/2014 |

*Primary Examiner* — Tyler J Lee
*Assistant Examiner* — Yufeng Zhang
(74) *Attorney, Agent, or Firm* — ArentFox Schiff LLP (57) ABSTRACT

The disclosure provides a steering system for a vehicle. The steering system may include a steering rack and an electronic power steering (EPS) system. The EPS system may include an actuator that assists movement of the steering rack, a torque sensor; an angle sensor; and an EPS system controller. The EPS controller may be configured to determine a steering rack center point indicating a center of the steering rack between opposite maximum steering angles. The EPS controller may be configured to determine a vehicle center zero point. The EPS controller may be configured to store the vehicle center zero point in response to determining that the vehicle center zero point is within a threshold of the steering rack center point.

18 Claims, 6 Drawing Sheets

(56) References Cited

U.S. PATENT DOCUMENTS

| | | |
|---|---|---|
| 10,011,296 B2 | 7/2018 | El Aile et al. |
| 2010/0145579 A1 | 6/2010 | O'Brien |
| 2013/0226394 A1* | 8/2013 | Amirpour ............. G01M 17/06 701/31.4 |
| 2017/0008556 A1* | 1/2017 | Pregniard .......... B62D 15/0245 |
| 2017/0190355 A1 | 7/2017 | Ghoneim |
| 2018/0099691 A1* | 4/2018 | Kim ...................... B62D 6/008 |
| 2018/0346018 A1 | 12/2018 | Kataoka et al. |
| 2021/0214005 A1* | 7/2021 | O'Dea ............... B62D 15/0245 |
| 2022/0258795 A1* | 8/2022 | Niwa ..................... B62D 1/286 |

* cited by examiner

$RC1 = (RA1)/2$
$RC2 = (RA2)/2$
$RCA = (RC1+RC2)/2$
$RER = (RR1+RR2)/2$
$REL = (RL1+RL2)/2$

SETTING VEHICLE CENTER IN ELECTRONIC POWER STEERING SYSTEM

TECHNICAL FIELD

Aspects of the present disclosure relate to systems, devices and methods of operating thereof in automotive assembly, and in particular to systems, devices and methods of operating thereof for vehicle steering systems.

BACKGROUND

A vehicle may include a steering system. For example, a rack and pinion steering system may use a pinion attached to a steering shaft to laterally translate the rack. The rack, in turn, may be coupled to the steerable wheels via a tie rod. The steering system may include an electronic power steering (EPS) system that provides torque to rotate the pinion and/or steering shaft. In some cases such as for off-road vehicles, configuration parameters of the EPS system may be subject to variance based on the mechanical components of the steering system.

In view of the foregoing, there is a need for improved steering systems for vehicles and techniques for manufacturing and configuring such steering systems. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In an aspect, the present disclosure provides a steering system for a vehicle. The steering system may include a steering rack and an electronic power steering (EPS) system. The EPS system may include an actuator that assists movement of the steering rack, a torque sensor, an angle sensor; and an EPS system controller. The EPS system controller may be configured to determine a steering rack center point indicating a center of the steering rack between opposite maximum steering angles. The EPS system controller may be configured to determine a vehicle center zero point. The EPS system controller may be configured to store the vehicle center zero point in response to determining that the vehicle center zero point is within a threshold of the steering rack center point.

In another aspect, the present disclosure provides a vehicle. The vehicle may include two steerable wheels, each having an inner surface and an outer surface, and a tire mounted thereon. The vehicle may include a wheel support for each steerable wheel that rotatably supports the steerable wheel. The vehicle may include a steering rack coupled to each of the two steerable wheels. The vehicle may include a steering rack and an electronic power steering (EPS) system. The EPS system may include an actuator that assists movement of the steering rack, a torque sensor, an angle sensor; and an EPS system controller. The EPS system controller may be configured to determine a steering rack center point indicating a center of the steering rack between opposite maximum steering angles. The EPS system controller may be configured to determine a vehicle center zero point. The EPS system controller may be configured to store the vehicle center zero point in response to determining that the vehicle center zero point is within a threshold of the steering rack center point.

In another aspect, the present disclosure provides a method of configuring an electronic power steering system for a vehicle. The method may include determining a steering rack center point indicating a center of a steering rack between opposite maximum steering angles. The method may include determining a vehicle center zero point. The method may include storing the vehicle center zero point in response to determining that the vehicle center zero point is within a threshold of the steering rack center point.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "vehicle," as used herein, refers to any manned or unmanned structure capable of moving and is powered by any form of energy. The term "vehicle" includes, but is not limited to: cars, trucks, vans, minivans, SUVs, motorcycles, scooters, boats, personal watercraft, submersibles, aircraft, and spacecraft. In some cases, a motor vehicle includes one or more engines.

It should be understood that the description and drawings herein are merely illustrative and that various modifications and changes can be made in the structures disclosed without departing from the present disclosure. In general, the figures of the example vehicle roof structure are not to scale. As used herein, lateral directions are transverse across the vehicle, i.e., left and right directions. Likewise, longitudinal directions refer to forward and rearward directions of vehicle travel, and the vertical directions relate to elevation, i.e., upward and downward directions. It will also be appreciated that the various identified components of the example vehicle door system disclosed herein are merely terms of art that may vary from one manufacturer to another and should not be deemed to limit the present disclosure.

Generally described, the present disclosure provides for a steering system for a vehicle including an electric power steering system that configures a vehicle center point for use with power steering operations including a return to center operation. The configuration of the vehicle center point is subject to vehicle condition and operator error. In an aspect, the present disclosure provides for vehicle center offset detection that utilizes a steering rack center to restrict the allowable values for the vehicle center point. The steering system may be configured using either an automatic procedure or a manual procedure for determining the steering rack center and the vehicle center point.

Figure 1:
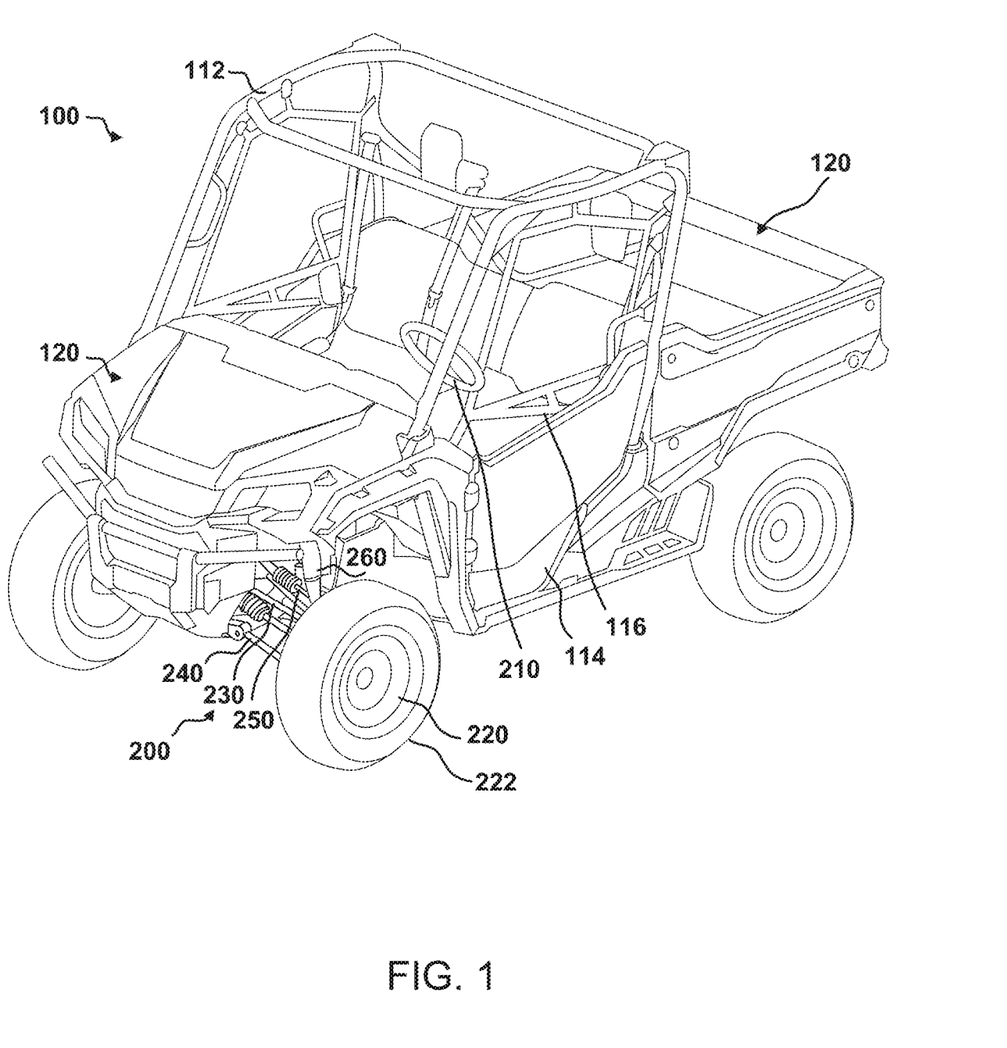
FIG. 1 shows a perspective view of an example multi-use vehicle having a steering system, according to an aspect of the disclosure.

Turning to the figures, in which like reference numbers refer to like components, FIG. 1 illustrates an example vehicle 100 including a steering system 200. The vehicle 100 may be a multi-use vehicle (MUV), off-road vehicle, or other vehicle designed for off-road driving. The vehicle 100 may include a passenger area 110, an engine compartment 120, and a rear cargo area 130. In an aspect, the passenger area 110 may be surrounded by a roll cage 112. The passenger area may include a two-part door including a rigid lower portion 114 and flexible (e.g., netting) upper portion 116.

The steering system 200 may include a steering wheel 210 that is coupled to steerable wheels 220 via a steering shaft, pinion, steering rack (not shown in FIG. 1), and tie rods 250. The steering system 200 may also include suspension components such as an upper control arm 230, lower control arm 240, and a cushion or shock absorber 260.

Figure 2:
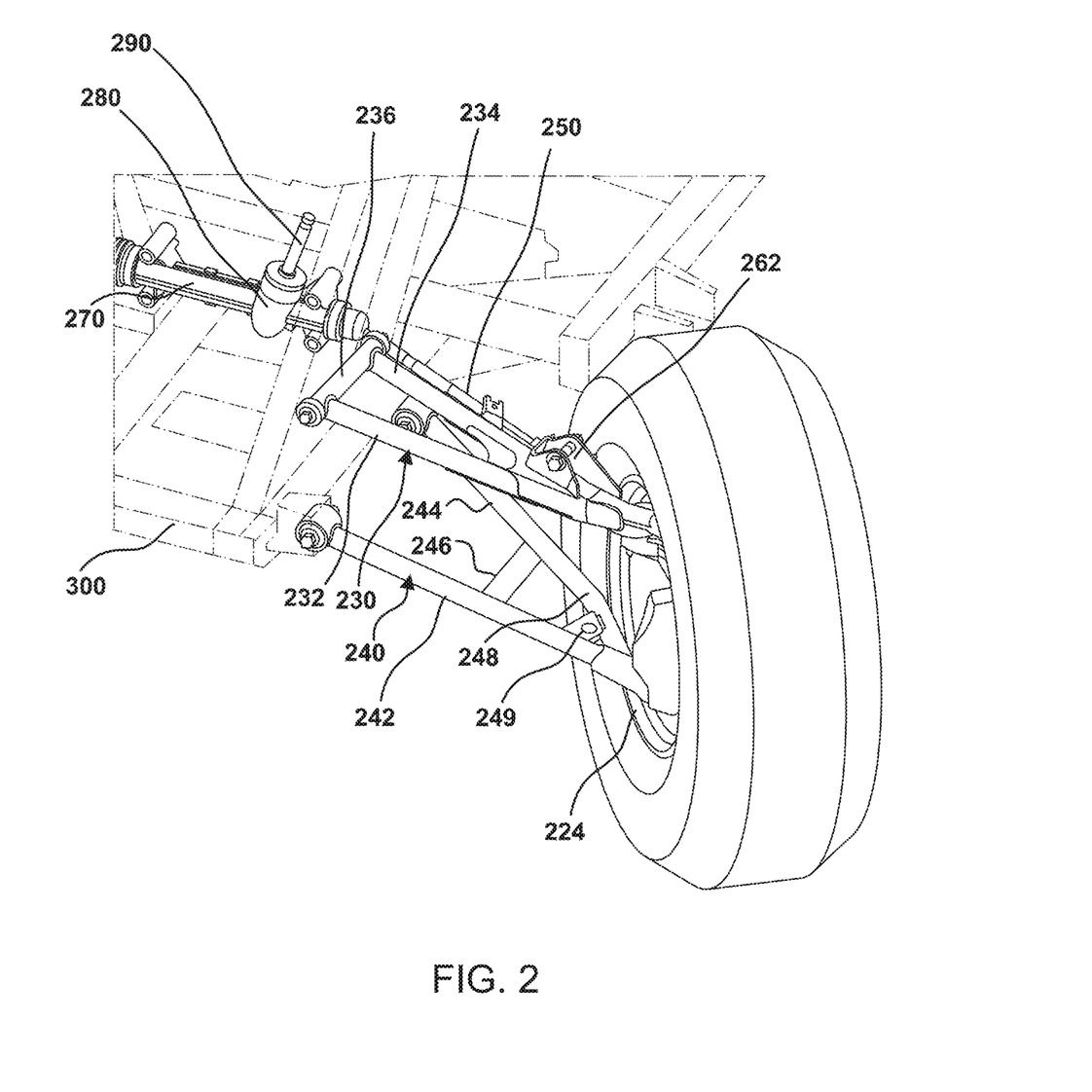
FIG. 2 shows a perspective view of an example vehicle frame and steering system, according to an aspect of the disclosure.

FIG. 2 shows a perspective view of various components of the steering system 200 connected to a vehicle frame 295. An outward direction may refer to a direction away from the vehicle frame 295, and an outer element may refer to an element that is located in the outward direction. Conversely, an inward direction may refer to a direction toward the vehicle frame 295, and an inner element may refer to an element that is located in the inward direction. Further, FIG. 2 shows the front left side of the example steering system 200. It should be understood that the front right side of the example steering system may include opposite components arrange symmetrically with the left side.

The upper control arm 230 may also be referred to as an A-arm or wishbone. The upper control arm 230 may include a front member 232 and a rear member 234. The inner ends of the front member 232 and the rear member 234 may be connected via a cylindrical pivot pipe 236 that pivotably mounts to the frame 295, for example, via a bolt that passes through a bracket of the frame 295 and the cylindrical pivot pipe 236. The outer ends of the front member 232 and the rear member 234 may be joined together to form a triangle shape of the upper control arm 230. A bracket 262 may be formed at the juncture of the front member 232 and the rear member 234 and be coupled to the cushion or shock absorber 260 (FIG. 1). The outer end of the upper control arm 230 may support a vertical pivot that connects to the lower control arm 240 and allows the wheel 220 to turn about a vertical axis.

The lower control arm 240 may also be referred to as an A-arm or wishbone. The lower control arm 240 may include a forward member 242, a rear member 244, and a cross member 246. The lower control arm 240 may be pivotably coupled to the frame 295 at an inner end of each of the forward member 242 and the rear member 244. For example, each of the forward member 242 and the rear member 244 may include a cylindrical pivot pipe that receives a bolt that also passes through a bracket of the frame 295. The outer end of the lower control arm 240 may be connected to a vertical pivot that allows the wheel 220 to rotate about a vertical axis.

In an aspect, the lower control arm 240 may include a curved portion 248. The curved portion 248 may be concave such that the outer surface of the curved portion 248 faces the inner surface 224 of the wheel 220. The radius of curvature of the curved portion 248 may be less than a radius of curvature of the inner surface 224 of the wheel 220 and the tire 222 such that when the wheel 220 is turned to a maximum steering angle, the outer surface of the curved portion 248 may contact the inner surface 224 of the wheel 220 without contacting the tire 222. Accordingly, the metal on metal contact between the outer surface of the curved portion 248 and the inner surface 224 of the wheel 220 may prevent further rotation of the wheel 220 about the vertical axis past the maximum steering angle. Force causing the rotation of the wheel 220 (e.g., from an impact) may be transferred to the lower control arm 240. The metal on metal contact may allow the wheel 220 to continue rotating about the horizontal axis by sliding along the curved portion 248. In an aspect, the curved portion 248 may be reinforced. For example, the cross member 246 and a reinforcement cross member 249 may be located between the rear member 244 and the forward member 242 near the curved portion 248. For example, the cross member 246 and the reinforcement cross member 249 may be on the opposite sides of the curved portion 248 to provide reinforcement. The curved portion 248 may also be reinforced by having thicker dimensions or cladding to withstand the metal on metal contact.

The steering system 200 may be a rack and pinion type steering system. The steering wheel 210 may be connected to the steering shaft 290, which may be connected to a pinion gear within pinion housing 280. The teeth of the pinion gear may engage teeth of a steering rack within the rack housing 270. Turning the steering wheel 210 may cause the pinion gear to rotate and slide the steering rack laterally, left or right, depending on the direction the steering wheel 210 is turned. In an aspect, the pinion housing 280 may include an electronic power steering (EPS) system that provides assistance in rotating the pinion gear. The EPS system may include an actuator (e.g., motor), an EPS controller, an angle sensor, and a torque sensor.

The steering rack may be coupled to a tie rod 250 that connects to the vertical pivot between the control arms 230, 240. Accordingly, the tie rod 250 may turn the lateral movement of the steering rack into turning of the wheel 220 about the vertical axis.

Figure 3:
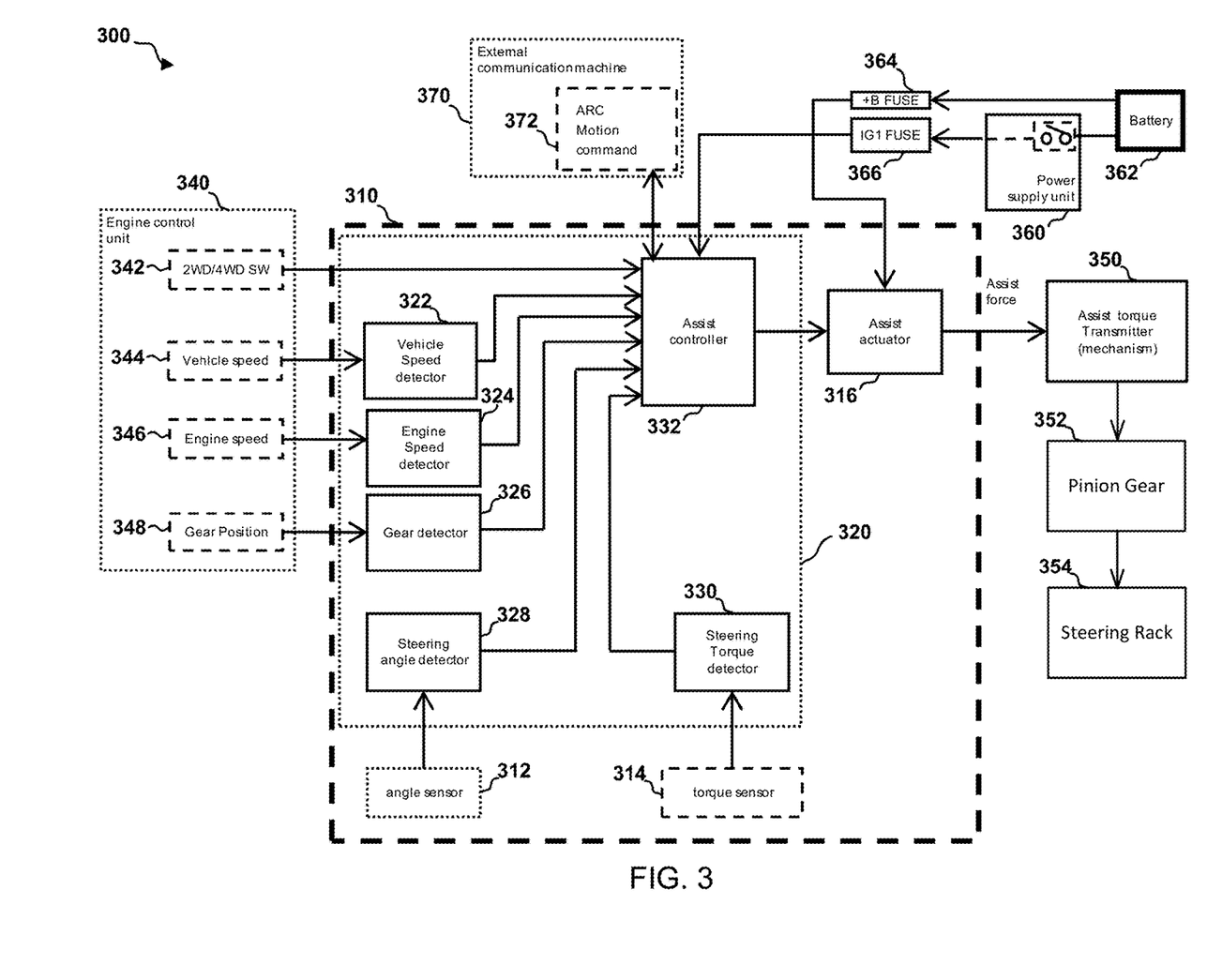
FIG. 3 shows a block diagram of an example environment and architecture of an electronic power steering system.

FIG. 3 is a block diagram of an example environment 300 of an example EPS system 310. The environment 300 may be within the vehicle 100 or the steering system 200. The EPS system 310 may include an angle sensor 312, a torque sensor 314, an assist actuator 316, and a EPS controller 320. The environment 300 may include an engine control unit 340 that provides various measurements to the EPS system 310 such as a 2-wheel drive (2 WD) or 4-wheel (4 WD) drive switch status 342, a vehicle speed 344, an engine speed 346, and a gear position 348. The environment 300 may include an assist torque transmitter 350, which may be coupled with the assist actuator 316 and mechanically transmit torque to the pinion gear 352, which moves the steering rack 354. For example, the assist torque transmitter 350 may be a gear or a belt. The environment 300 may include a power supply unit 360 coupled with the EPS system 310. For example, the power supply unit 360 may couple a battery 362 to the EPS system 310 via a +B fuse 364 and a IG1 fuse 366. The environment 300 may include an external communication machine 370, which may be, for example, a line end unit at a factory or a service diagnosis tool that issues one or more automatic rack centering motions commands 372.

The EPS controller 320 may receive input from the engine control unit 340, the angle sensor 312, and the torque sensor 314. The EPS controller 320 may include a vehicle speed detector 322, an engine speed detector 324, a gear detector 326, a steering angle detector 328, and a steering torque detector 330 that provide input signals to an assist controller 332. The assist controller 332 may be configured to perform various operations based on the input signals. In particular, the assist controller 332 may perform a return to center (RTC) operation in which the assist controller 332 exerts torque on the steering rack 354 toward the vehicle center zero point. Other example operations of the assist controller 332 include a rack end function that reduces EPS assist torque when the steering rack 354 approaches an end of its mechanical stroke.

In an aspect of the present disclosure, the assist controller 332 may learn parameters for the operations. In particular, for the RTC operation, the assist controller 332 may utilize a vehicle center zero point parameter that indicates an angle/position of the steering rack at which the vehicle travels straight. The parameters may vary based on a configuration of the mechanical components of the steering system 200. For example, the vehicle center zero point parameter may be slightly different than a steering rack center point indicating a center of the steering rack between opposite maximum steering angles. In an aspect, the vehicle center zero point parameter may be set within a threshold of the steering rack center point. For instance, the threshold may be an angle of plus or minus less than 2 degrees, and is preferably less than 1 degree.

The assist controller 332 may learn the parameters at a factory during end of line testing or at a service center. For example, the parameters may be relearned when there are changes to or replacement of steering system components. The assist controller 332 may learn the parameters either automatically when connected to the external communication machine 370 or manually when specific conditions are satisfied.

Figure 4:
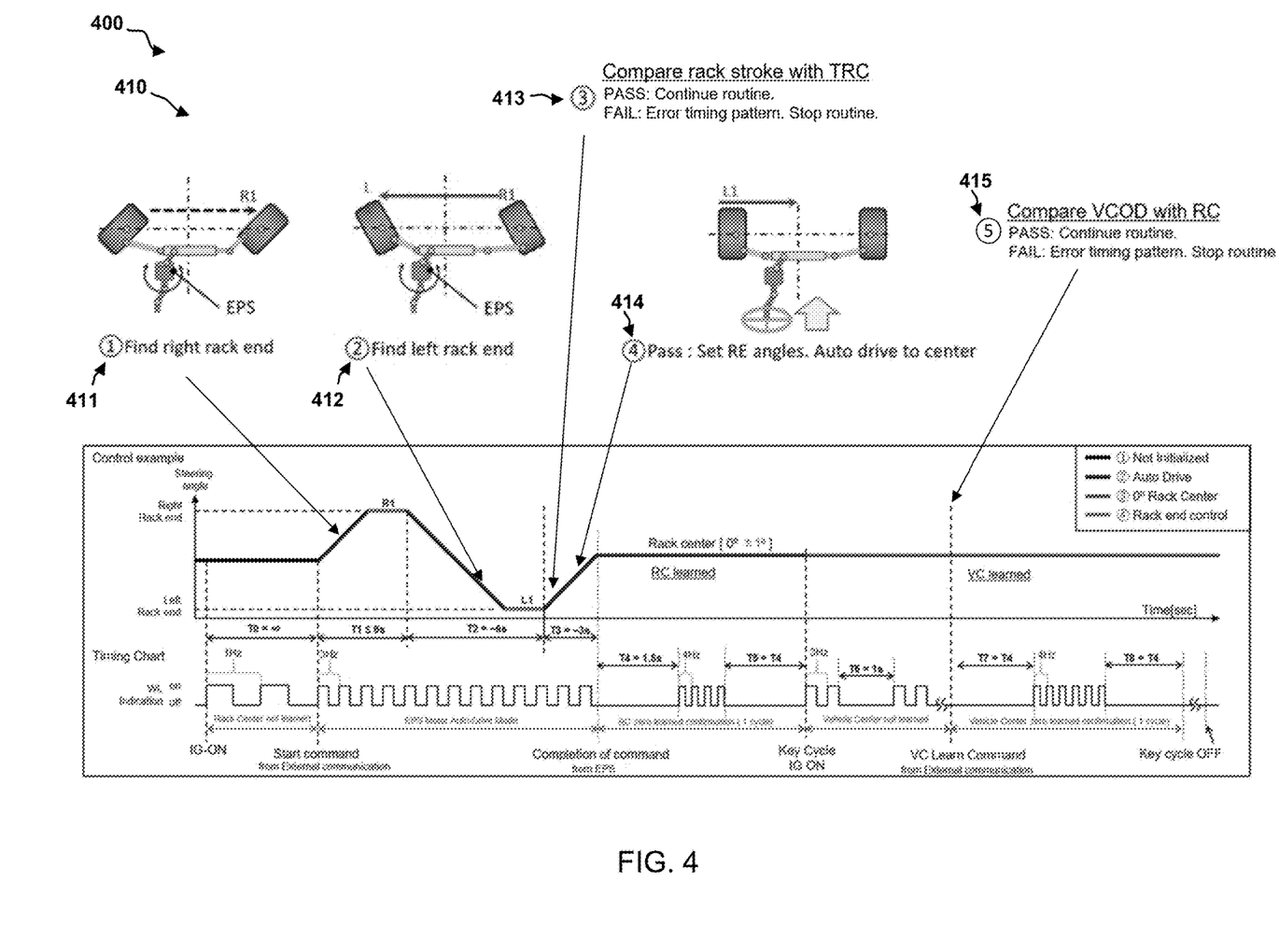
FIG. 4 shows an example procedure for automatically configuring a steering rack center point and vehicle center point.

FIG. 4 is a diagram 400 illustrating an example procedure 410 for learning steering rack end (RE) positions, steering rack center (RC) position, and vehicle center (VC) position. The procedure 410 may be performed by the assist controller 332 in communication with the external communication machine 370. Example commands and signaling with the external communication machine 370 is illustrated.

The procedure 410 may start when the ignition is switched on when the rack center is not learned. For example, the procedure 410 may be performed for an initialization of the vehicle or after a maintenance or repair procedure. The external communication machine 370 may issue a start command to start the procedure 410. In a first step 411, the assist controller 332 may find the right rack end. For example, the assist controller 332 may exert a steering torque to increase the steering angle to the right until a mechanical stop of the steering rack 354 is reached. The assist controller 332 may store the steering angle of the right rack end. In a second step 412, the assist controller 332 may find the left rack end. For example, the assist controller 332 may exert a steering torque to decrease the steering angle to the left until a mechanical stop of the steering rack 354 is reached. The assist controller 332 may store the steering angle of the left rack end.

In a third step 413, the assist controller 332 may compare a rack stroke with a theoretical rack center (TRC). The TRC may be a parameter stored in the assist controller 332 for a design of the vehicle 100. The assist controller 332 may determine an actual rack center as a midpoint of the right rack and the left rack end. The assist controller 332 may store the actual rack center as the RC zero point when the actual rack center is within tolerance (e.g., plus or minus one degree) of the TRC. If the assist controller 332 does not allow storing the actual rack center, the procedure 410 may stop. In a fourth step 414, the assist controller 332 may store the rack end values and the rack center zero point. The assist controller 332 may drive the steering rack 354 to the rack center zero point In a fifth step 415, after rack center is learned, vehicle center (VC) can be learned. The vehicle 100 is driven straight in 4WD at a defined speed. When conditions are met, the driver removes hands from wheel while continuing at fixed speed. A request is made to the EPS to set VC zero point. The assist controller 332 compares the requested set zero angle value to stored RC zero point plus a tolerance (e.g., plus or minus 1 degree). If requested VC zero point is within range of the RC zero point, the VC zero point is stored. If the requested VC set point is outside tolerance of the stored RC, the VC zero point is not set and an error is recorded. If the procedure 410 is repeated and the VC zero point is learned correctly, the error is erased.

The procedure 410 may initialize the angle sensor 312 and assist controller 332 with parameters for performing EPS assist operations. The assist controller 332 may utilize control logic for vehicle center offset detection (VCOD) that restricts the angular range in which VC zero angle can be stored from RC thereby creating a controlled and repeatable assembly process. This control logic may ensure that vehicle steering performance meets design intent for RTC function.

Figure 5:
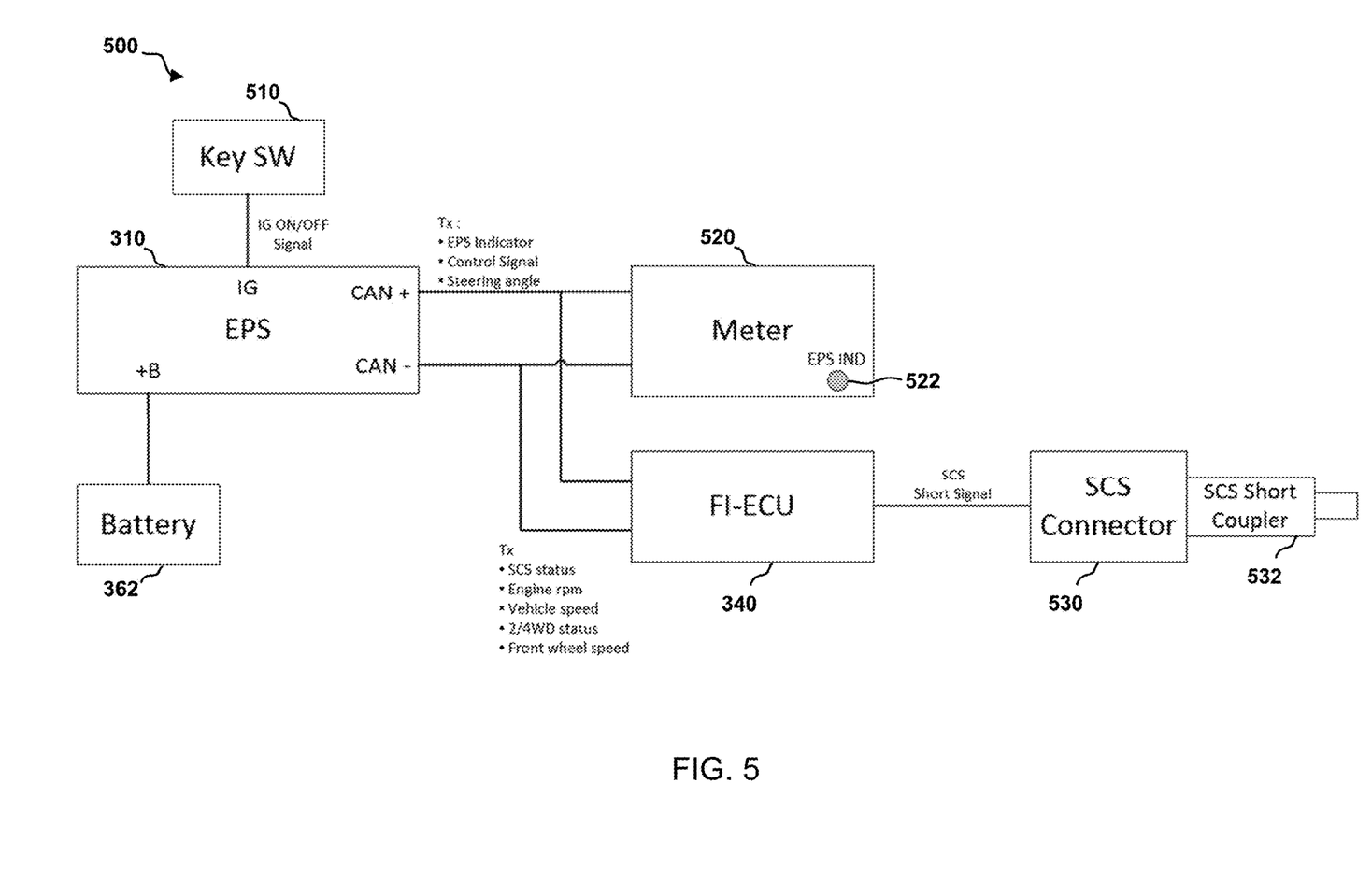
FIG. 5 shows an example architecture for manually configuring a steering rack center point and vehicle center point.

FIG. 5 is a block diagram 500 illustrating an example system for manually configuring the parameters of the EPS system 310. The EPS system 310 may be coupled with the batter 362 and ECU 340 as discussed above. Instead of the external communication machine 370, the manual configuration may utilize a meter 520 including an EPS indicator 522 and a service check short (SCS) connector 530 with an SCS short coupler 532. The EPS system 310 may also receive an ignition signal from a key switch 510. The EPS system 310 may transmit an EPS indicator signal, a control signal, and a steering angle to the meter 520 and the ECU 340. The meter 520 may display the EPS indicator signal using the EPS indicator 522. For example, the EPS indicator 522 may be a light that blinks based on the EPS indicator signal, or the meter 520 may translate the EPS indicator signal into a message. The SCS connector 350 may provide an SCS short signal to the ECU 340. The ECU 340 may provide an SCS status to the EPS system 310. The ECU 340 may also provide the 2WD/4WD status 342, vehicle speed 344, engine speed 346, and gear position 348 as discussed above. As discussed above, the EPS system 310 may include the angle sensor 312 and the torque sensor 314. An operator may perform a manual configuration procedure using vehicle controls (e.g., steering wheel), the meter 520, and the SCS connector 530.

Figure 6:
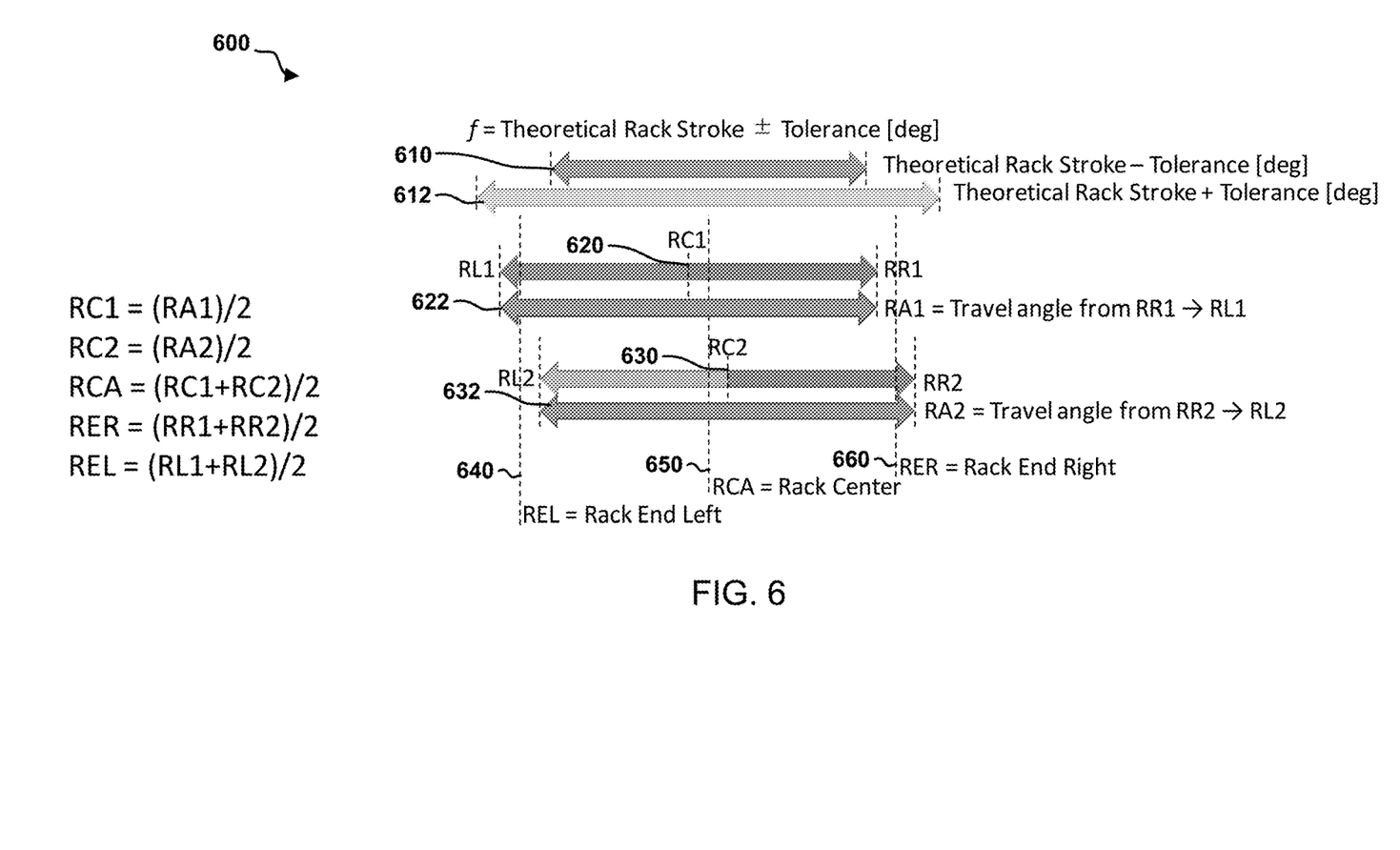
FIG. 6 shows calculations for manually configuring a steering rack center point and vehicle center point.

FIG. 6 is a diagram 600 illustrating example calculations that may be used with the manual configuration procedure. The theoretical rack stroke for the vehicle 100 may be stored in the assist controller 332. A minimum rack stroke 610 may be determined based on the theoretical rack stroke minus a tolerance (e.g., less than 2 degrees, preferably 1 degree). A maximum rack stroke 612 may be determined based on the theoretical rack stroke plus the tolerance.

The manual configuration procedure may start with the ignition switch 510 in an off position. The vehicle 100 may be raised to lift the front wheels. The steering wheel may be turned to the left end position. The SCS short coupler 532 may be connected to the SCS connector 530. The operator may turn the steering wheel to apply torque toward the left to start the configuration. The ignition switch 510 may be turned to the on position and the steering torque may be released to enter an erase mode. The EPS indicator 522 may be on, and turns off after 4 seconds. The operator may steer the steering wheel to the right until the right rack end position, and maintain torque toward the right for at least 1 second. The assist controller 332 stores a first right rack end position (RR1). The operator may steer the steering wheel to the left until the left rack end position, and maintain torque toward the left for at least 1 second. The assist controller 332 stores a first left rack end position (RL1). The assist controller 332 calculates a first rack stroke (RA1) 622 based on the first right end position and the first left end position (e.g., RA1=RR1−RL1). If RA1 622 is between the minimum rack stroke 610 and the maximum rack stroke 612, the assist controller 332 may store RA1. Otherwise, the assist controller 332 may generate an error indication. The assist controller 332 may determine a first rack center RC1 620 as a midpoint between RL1 and RR1.

The operator may steer the steering wheel back to the right until the right rack end position, and maintain torque toward the right for at least 1 second. The assist controller 332 stores a second right rack end position (RR2). The operator may steer the steering wheel back to the left until the left rack end position, and maintain torque toward the left for at least 1 second. The assist controller 332 stores a second left rack end position (RL2). The assist controller 332 calculates a second rack stroke (RA2) 632 based on the second right end position and the second left end position (e.g., RA2=RR2−RL2). The assist controller 332 may determine a second rack center RC2 630 as a midpoint between RL2 and RR2. If the RA1 and RA2 are within the tolerance of the theoretical rack stroke (e.g., between minimum rack stroke 610 and maximum rack stroke 612), the assist controller 332 calculates the rack end left (REL) 640, rack end right (RER) 660, and rack center (RCA) 650. For example, REL 640 may be the average of RL1, and RER 660 may be the average of RR1 and RR2. The RCA 650 may be the average of the midpoints of RA1 and RA2. For example, the first midpoint RC1=(RA1)/2 and the second midpoint RC2=(RA2)/2.

To learn the vehicle center point, the operator may move the steering wheel to approximately the rack center location and adjust the vehicle toe to within tolerance. The vehicle center point may be set while the vehicle is in motion on flat ground. The ignition is turned off and the SCS short coupler 532 is connected. The operator applies a small amount (e.g., 3N−m) of torque toward the left. The operator turns the ignition switch 510 to the on position. The operator releases the steering torque while the EPS indicator 522 is on. The operator starts the engine and the EPS indicator 522 indicates a VC learning mode. The operator moves the vehicle forward at a speed between 5 kilometers per hour (kph) and 20 kph without operating the steering wheel. The self-aligning torque of the steering system 200 steers the vehicle 100 to vehicle center. The operator moves the vehicle forward at least 50 feet and stops the vehicle. The front wheels will be at the kinematic center position of the vehicle 100. The assist controller 332 stores the steering angle position as the vehicle center if the steering angle position is within the threshold of the rack center position. The operator disconnects the SCS short coupler 532 and turns the vehicle off. Accordingly, the manual procedure may alternatively initialize the angle sensor 312 and assist controller 332 with parameters for performing EPS assist operations using VCOD that restricts the angular range in which VC zero angle can be stored from RC thereby creating a controlled and repeatable assembly process. In particular, comparing the vehicle center point to the rack center point reduces likelihood of erroneous values being stored due to operator error.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A steering system for a vehicle, comprising:
 a steering rack; and
 an electronic power steering (EPS) system including:
  an actuator that assists movement of the steering rack;
  a torque sensor;
  an angle sensor; and
  an EPS system controller configured to:
   determine a steering rack center point indicating a center of the steering rack between opposite maximum steering angles based on measurements in response to being placed in a configuration mode;
   measure first and second, left and right, rack end positions while the steering rack is moved through a full range of motion twice;
   calculate first and second travel angles based on the respective first and second, left and right, rack end positions;
   calculate the steering rack center point based on an average of the first and second travel angles;
   determine a vehicle center zero point based on measurements in response to being placed in the configuration mode;
   record a measured vehicle center after traveling straight at a constant speed with no input torque if the measured vehicle center is within a threshold of the steering rack center point; and
   store the measured vehicle center as the vehicle center zero point in response to determining that the measured vehicle center is within the threshold of the steering rack center point.

2. The steering system of claim 1, wherein the EPS system controller is configured to determine the steering rack center point by:
 measuring, by the angle sensor, a left steering rack end;
 measuring, by the angle sensor, a right steering rack end; and
 calculating the steering rack center point as a mid-point between the left steering rack end and the right steering rack end.

3. The steering system of claim 1, wherein the EPS system controller is configured to determine the vehicle center zero point by allowing the steering rack to travel to a vehicle kinematic center position in response to self-aligning torque while the vehicle is traveling straight at a substantially constant speed.

4. The steering system of claim 1, wherein the EPS system controller is further configured to perform a return to center operation that exerts torque on the steering rack toward the vehicle center zero point.

5. The steering system of claim 1, wherein the EPS system controller is further configured to receive an automatic rack centering command from an external device, wherein the EPS system controller determines the steering rack center point in response to the automatic rack centering command.

6. The steering system of claim 5, wherein the EPS system controller is configured to drive the actuator to move the steering rack to a left rack end and a right rack end in response to the automatic rack centering command, and wherein the EPS system controller is configured to store a measurements of the angle sensor at the left rack end and the right rack end to calculate the steering rack center point.

7. The steering system of claim 6, wherein the EPS system controller is configured to provide an indication signal to a meter that provides a visual indication of a configuration status to an operator of the vehicle.

8. The steering system of claim 1, wherein the threshold is less than 2 degrees.

9. A vehicle, comprising:
two steerable wheels, each having an inner surface and an outer surface, and a tire mounted thereon;
a wheel support for each steerable wheel that rotatably supports the steerable wheel;
a steering rack coupled to each of the two steerable wheels; and
an electronic power steering (EPS) system including:
an actuator that assists movement of the steering rack;
a torque sensor;
an angle sensor; and
an EPS system controller configured to:
determine a steering rack center point indicating a center of the steering rack between opposite maximum steering angles based on measurements in response to being placed in a configuration mode;
measure first and second, left and right, rack end positions while the steering rack is moved through a full range of motion twice;
calculate first and second travel angles based on the respective first and second, left and right, rack end positions;
calculate the steering rack center point based on an average of the first and second travel angles;
determine a vehicle center zero point based on measurements in response to being placed in the configuration mode;
record a measured vehicle center after traveling straight at a constant speed with no input torque if the measured vehicle center is within a threshold of the steering rack center point; and
store the measured vehicle center as the vehicle center zero point in response to determining that the measured vehicle center is within the threshold of the steering rack center point.

10. The vehicle of claim 9, wherein the EPS system controller is configured to determine the steering rack center point by:
measuring, by the angle sensor, a left steering rack end;
measuring, by the angle sensor, a right steering rack end; and
calculating the steering rack center point as a mid-point between the left steering rack end and the right steering rack end.

11. The vehicle of claim 9, wherein the EPS system controller is configured to determine the vehicle center zero point by allowing the steering rack to travel to a vehicle kinematic center position in response to self-aligning torque while the vehicle is traveling straight at a substantially constant speed.

12. The vehicle of claim 9, wherein the EPS system controller is further configured to perform a return to center operation that exerts torque on the steering rack toward the vehicle center zero point.

13. The vehicle of claim 9, wherein the EPS system controller is further configured to receive an automatic rack centering command from an external device, wherein the EPS system controller determines the steering rack center point in response to the automatic rack centering command.

14. The vehicle of claim 13, wherein the EPS system controller is configured to drive the actuator to move the steering rack to a left rack end and a right rack end in response to the automatic rack centering command, and wherein the EPS system controller is configured to store a measurements of the angle sensor at the left rack end and the right rack end to calculate the steering rack center point.

15. The vehicle of claim 9, wherein the EPS system controller is configured to provide an indication signal to a meter that provides a visual indication of a configuration status to an operator of the vehicle.

16. The vehicle of claim 9, wherein the threshold is less than 2 degrees.

17. A method of configuring an electronic power steering system (EPS) for a vehicle, comprising, by an EPS system controller of the vehicle:
determining a steering rack center point indicating a center of a steering rack between opposite maximum steering angles based on measurements in response to the EPS system controller being placed in a configuration mode, wherein determining the steering rack center point comprises:
measuring, via an angle sensor, first and second, left and right, rack end positions while the steering rack is moved through a full range of motion twice;
calculating first and second travel angles based on the respective first and second, left and right, rack end positions; and
calculating the steering rack center point based on an average of the first and second travel angles; and
determining a vehicle center zero point based on measurements in response to the EPS system controller being placed in the configuration mode, wherein determining the vehicle center zero point comprises:
recording a measured vehicle center, measured by the angle sensor, after traveling straight at a constant speed with no input torque if the measured vehicle center is within a threshold of the steering rack center point; and
storing the measured vehicle center as the vehicle center zero point in response to determining that the measured vehicle center is within the threshold of the steering rack center point.

18. The method of claim 17, wherein determining the steering rack center point comprises:
measuring, by the angle sensor, a left steering rack end;
measuring, by the angle sensor, a right steering rack end; and calculating the steering rack center point as a mid-point between the left steering rack end and the right steering rack end, and wherein determining the vehicle center zero point comprises allowing the steering rack to travel to a vehicle kinematic center position in response to self-aligning torque while the vehicle is traveling straight at a substantially constant speed.

* * * * *